US009212534B2

(12) United States Patent
Ballew et al.

(10) Patent No.: US 9,212,534 B2
(45) Date of Patent: *Dec. 15, 2015

(54) PLUGGING AND ABANDONING A WELL USING A SET-DELAYED CEMENT COMPOSITION COMPRISING PUMICE (71) Applicant: Halliburton Energy Services, Inc., Houston, TX (US)

(72) Inventors: Horton Colby Ballew, Montgomery, TX (US); Thomas Jason Pisklak, Cypress, TX (US); Kyriacos Agapiou, Houston, TX (US); Peter James Boul, Houston, TX (US); Pauline Akinyi Otieno, Spring, TX (US); Lance Everett Brothers, Chickasha, OK (US); Ronnie Glen Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/090,573

(22) Filed: Nov. 26, 2013

(65) Prior Publication Data

US 2014/0216746 A1 Aug. 7, 2014

Related U.S. Application Data (63) Continuation-in-part of application No. 13/417,001, filed on Mar. 9, 2012, now Pat. No. 8,851,173.

(51) Int. Cl.
*E21B 33/13* (2006.01)
*C09K 8/467* (2006.01)
(Continued)

(52) U.S. Cl.
CPC .............. *E21B 33/13* (2013.01); *C04B 28/18* (2013.01); *C04B 40/0658* (2013.01); *C09K 8/467* (2013.01)

(58) Field of Classification Search
None
See application file for complete search history.

(56) References Cited

U.S. PATENT DOCUMENTS 2,848,051 A * 8/1958 Williams ............... 166/291
3,557,876 A   1/1971 Tragesser
3,887,009 A   6/1975 Miller et al.
(Continued)

FOREIGN PATENT DOCUMENTS

WO      9620899      7/1996
WO    2011/161411   12/2011

OTHER PUBLICATIONS

U.S. Office Action for U.S. Appl. No. 13/417,001 dated Apr. 16, 2014.
(Continued)

*Primary Examiner* — Kevin Flynn
*Assistant Examiner* — Anuradha Ahuja
(74) *Attorney, Agent, or Firm* — Craig W. Roddy; Tumey L.L.P.

(57) ABSTRACT

Disclosed herein are cement compositions and methods of using set-delayed cement compositions in subterranean formations. In one embodiment a method of plugging a wellbore is described. The method comprises providing a set-delayed cement composition comprising pumice, hydrated lime, a cement set retarder, and water; activating the set-delayed cement composition to produce an activated set-delayed cement composition; introducing the activated set-delayed cement composition into the wellbore; and allowing the activated set-delayed cement composition to form a plug in the wellbore that has a permeability of less than 0.1 millidarcy.

20 Claims, 5 Drawing Sheets (51) Int. Cl.
*C04B 28/18* (2006.01)
*C04B 40/06* (2006.01)

(56) References Cited

U.S. PATENT DOCUMENTS

| | | | |
|---|---|---|---|
| 3,959,003 A | 5/1976 | Ostroot et al. | |
| 4,054,462 A * | 10/1977 | Stude | 106/717 |
| 4,349,443 A | 9/1982 | Block | |
| 4,350,533 A | 9/1982 | Galer et al. | |
| 4,462,837 A * | 7/1984 | Baker et al. | 106/720 |
| 4,515,216 A | 5/1985 | Childs et al. | |
| 4,519,452 A | 5/1985 | Tsao et al. | |
| 4,524,828 A | 6/1985 | Sabins et al. | |
| 4,676,832 A | 6/1987 | Childs et al. | |
| 4,818,288 A | 4/1989 | Aignesberger et al. | |
| 4,875,937 A | 10/1989 | Viles | |
| 5,058,679 A | 10/1991 | Hale et al. | |
| 5,263,542 A | 11/1993 | Brothers | |
| 5,314,022 A * | 5/1994 | Cowan et al. | 166/293 |
| 5,447,197 A | 9/1995 | Rae et al. | |
| 5,503,671 A | 4/1996 | Casabonne et al. | |
| 5,547,506 A | 8/1996 | Rae et al. | |
| 6,173,778 B1 | 1/2001 | Rae et al. | |
| 6,279,655 B1 | 8/2001 | Pafitis et al. | |
| 6,333,005 B1 | 12/2001 | Nguyen et al. | |
| 6,457,523 B1 | 10/2002 | Vijn et al. | |
| 6,488,762 B1 | 12/2002 | Shi | |
| 6,610,140 B2 | 8/2003 | Vijn et al. | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,199,086 B1 | 4/2007 | Roddy et al. | |
| 7,201,798 B2 | 4/2007 | Brothers et al. | |
| 7,244,303 B2 | 7/2007 | Chatterji et al. | |
| 7,338,923 B2 | 3/2008 | Roddy et al. | |
| 7,445,669 B2 | 11/2008 | Roddy et al. | |
| 7,478,675 B2 | 1/2009 | Roddy et al. | |
| 7,559,369 B2 | 7/2009 | Roddy et al. | |
| 7,572,329 B2 | 8/2009 | Liu et al. | |
| 7,575,055 B2 | 8/2009 | Reddy et al. | |
| 7,617,870 B1 | 11/2009 | Roddy et al. | |
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,757,765 B2 | 7/2010 | Hilleary et al. | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,183,186 B2 | 5/2012 | Luo | |
| 8,281,859 B2 | 10/2012 | Roddy et al. | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,486,869 B2 | 7/2013 | Brenneis et al. | |
| 8,851,173 B2 * | 10/2014 | Brothers et al. | 166/292 |
| 8,865,244 B2 | 10/2014 | Sweeney et al. | |
| 8,910,708 B2 | 12/2014 | Chatterji et al. | |
| 2002/0050232 A1 * | 5/2002 | Yamashita et al. | 106/802 |
| 2002/0162657 A1 | 11/2002 | Tumlin et al. | |
| 2003/0121456 A1 | 7/2003 | Griffith et al. | |
| 2003/0188669 A1 | 10/2003 | Sobolev et al. | |
| 2003/0221778 A1 | 12/2003 | Musch et al. | |
| 2004/0112600 A1 | 6/2004 | Luke et al. | |
| 2004/0127606 A1 * | 7/2004 | Goodwin | 524/2 |
| 2004/0211342 A1 | 10/2004 | Sprouts et al. | |
| 2004/0226484 A1 | 11/2004 | Chatterji et al. | |
| 2005/0079016 A1 | 4/2005 | Greenwood et al. | |
| 2006/0041060 A1 * | 2/2006 | George et al. | 525/56 |
| 2006/0054320 A1 * | 3/2006 | Brothers et al. | 166/292 |
| 2006/0166834 A1 | 7/2006 | Roddy et al. | |
| 2006/0249054 A1 | 11/2006 | Brothers et al. | |
| 2006/0249289 A1 | 11/2006 | Brothers et al. | |
| 2007/0089643 A1 * | 4/2007 | Roddy et al. | 106/692 |
| 2007/0125534 A1 * | 6/2007 | Reddy et al. | 166/277 |
| 2007/0235192 A1 | 10/2007 | Michaux et al. | |
| 2007/0289744 A1 | 12/2007 | Bingamon et al. | |
| 2008/0066652 A1 | 3/2008 | Fraser et al. | |
| 2008/0169100 A1 | 7/2008 | Lewis et al. | |
| 2009/0011207 A1 | 1/2009 | Dubey | |
| 2009/0020044 A1 * | 1/2009 | Constantz et al. | 106/738 |
| 2009/0038800 A1 * | 2/2009 | Ravi et al. | 166/292 |
| 2009/0105099 A1 | 4/2009 | Warrender et al. | |
| 2009/0124522 A1 | 5/2009 | Roddy | |
| 2010/0016183 A1 | 1/2010 | Roddy et al. | |
| 2010/0025039 A1 | 2/2010 | Roddy et al. | |
| 2010/0041792 A1 | 2/2010 | Roddy et al. | |
| 2010/0044043 A1 * | 2/2010 | Roddy et al. | 166/294 |
| 2010/0258312 A1 | 10/2010 | Brenneis et al. | |
| 2010/0270016 A1 | 10/2010 | Carelli et al. | |
| 2010/0273912 A1 | 10/2010 | Roddy et al. | |
| 2010/0282466 A1 * | 11/2010 | Brenneis et al. | 166/293 |
| 2010/0313795 A1 | 12/2010 | Guynn et al. | |
| 2011/0017452 A1 * | 1/2011 | Benkley et al. | 166/292 |
| 2011/0132605 A1 | 6/2011 | Sarap et al. | |
| 2011/0162845 A1 | 7/2011 | Ravi | |
| 2011/0305830 A1 * | 12/2011 | Frantz et al. | 427/230 |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2012/0249552 A1 * | 10/2012 | Harvill et al. | 345/426 |
| 2012/0251079 A1 * | 10/2012 | Meschter et al. | 386/278 |
| 2012/0252304 A1 * | 10/2012 | Vaughan | 446/71 |
| 2012/0291674 A1 | 11/2012 | Brenneis et al. | |
| 2012/0325478 A1 | 12/2012 | Muthusamy et al. | |
| 2013/0233550 A1 | 9/2013 | Brothers et al. | |
| 2013/0248183 A1 | 9/2013 | Pisklak | |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0090843 A1 | 4/2014 | Boul et al. | |
| 2014/0174741 A1 | 6/2014 | Agapiou et al. | |
| 2014/0190696 A1 | 7/2014 | Iverson et al. | |
| 2014/0194891 A1 | 7/2014 | Shahoian et al. | |
| 2014/0318419 A1 | 10/2014 | Chatteni et al. | |
| 2015/0175481 A1 | 6/2015 | Pisklak et al. | |
| 2015/0175869 A1 | 6/2015 | Agapiou et al. | |
| 2015/0197033 A1 | 7/2015 | Agapiou et al. | |
| 2015/0197453 A1 | 7/2015 | Pisklak et al. | |

OTHER PUBLICATIONS

HES brochure Enhancer 923™ Cement Agent, H07745 Jun. 2010.
Ramy N.Eid, Liquid Cement: Changing the Paradigm, Society of Petroleum Engineers, Apr. 15, 2007.
Notice of Allowance for U.S. Appl. No. 13/417,001 dated Mar. 9, 2012, Aug. 4, 2014.
Search Report and Written Opinion for International Application No. PCT/US2014/032150 dated Aug. 21, 2014.
Official Action for U.S. Appl. No. 14/478,869 dated Feb. 26, 2015.
Official Action for U.S. Appl. No. 14/098,198 dated Nov. 20, 2014.
Official Action for U.S. Appl. No. 14/067,143 dated Mar. 12, 2015.
Search Report and Written Opinion for International Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US14/054794 dated Sep. 9, 2014.
Search Report and Written Opinion for International Application PCT/US14/054496 dated Sep. 8, 2014.

(56) References Cited

OTHER PUBLICATIONS

Search Report and Written Opinion for International Application PCT/US14/054380 dated Sep. 5, 2014.
Search Report and Written Opinion for International Application PCT/US14/067112 dated Mar. 5, 2015.
Search Report and Written Opinion for International Application PCT/US14/068804 dated Mar. 17, 2015.
Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.
Rae et al., "Liquid Cement Premix Introduces New Solutions to Conventional Cementing Problems", IADC/SPE 35086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al., "New Technology Eliminates Bulking in Cementing Operations", SPE 36478, pp. 645-653, SPE, Inc., 1996.
Anderson et al., "New Technology Improves Cement Slurry Design", SPE 36973, pp. 127-136, SPE, Inc., 1996.
Shaefer et al., "Utilizing 'Over-Seas' Technology Improves the Cementing Processes in the DJ Basin of Colorado", SPE 80940, pp. 1-8, SPE, Inc., 2003.
"Liquid Stone® Cement Technology", Product Sales Bulletin, BJ Services Company, pp. 1-2, Oct. 19, 2004.
HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.
PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.
OFI Testing Equipment, Inc. Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics—Silikaty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Materials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
Southern Clay Products Data Sheet for Laponite RD, available from http://www.rockwoodadditives.com/ and viewed on Oct. 2013.
Daxad 19 MSDS, available from Geo Specialty Chemicals at http://www.geosc.com/ and last revised Sep. 20, 2013.
Liquiment 5581F Product Description available from BASF at http://www.oilfield-solutions.basf.com/ viewed on Oct. 2013.
Ethacryl G Product Description available from Arkema at http://www.arkema.com/ viewed on Oct. 2013.
SA-1015 Suspending Agent Product Description available from Halliburton Energy Services at http://www.halliburton.com/ viewed on Oct. 2013.
WellLife 684 Additive Product Description available from Halliburton Energy Services at http://www.halliburton.com/ viewed on Oct. 2013.
Halad-344 Fluid Loss Additive Product Description available from Halliburton Energy Services at http://www.halliburton.com/ viewed on Oct. 2013.
U.S. Appl. No. 14/090,494, filed Nov. 26, 2013.
V-Mar 3 Concrete Rheology-Modifying Admixture Product Description available from Grace Construction at http://www.na.graceconstruction.com/ viewed on Oct. 2013.
ISRWO for PCT Application No. PCT/US2015/017564 dated Jun. 3, 2015.
ISRWO for PCT Application No. PCT/US2015/019709 dated May 22, 2015.
Final Official Action for U.S. Appl. No. 14/098,198 dated Jun. 19, 2015.
Official Action for U.S. Appl. No. 14/090,573 dated Jun. 12, 2015.
Final Official Action for U.S. Appl. No. 14/478,869 dated Jun. 17, 2015.
Official Action for U.S. Appl. No. 13/854,115 dated Jul. 15, 2015.
Final Official Action for U.S. Appl. No. 14/067,143 dated Aug. 12, 2015.
Official Action for U.S. Appl. No. 14/019,730 dated Jun. 3, 2015.
Official Action for U.S. Appl. No. 14/048,486 dated Aug. 17, 2015.
Final Official Action for U.S. Appl. No. 14/019,730 dated Sep. 23, 2015.
Official Action for U.S. Appl. No. 14/048,463 dated Sep. 9, 2015.
Official Action for U.S. Appl. No. 14/478,813 dated Sep. 10, 2015.
International Search Report and Written Opinion for PCT/US15/21837 dated Jun. 23, 2015.
AkzoNobel Colloidal Silica, "Perspectives on Colloidal Silica," https://www.aksonobel.com/colloidalsilica/silica_Facts/perpectives, Jul. 9, 2015.

* cited by examiner

FIG. 8

PLUGGING AND ABANDONING A WELL USING A SET-DELAYED CEMENT COMPOSITION COMPRISING PUMICE

CROSS-REFERENCE TO RELATED APPLICATIONS

The present application is a continuation-in-part of U.S. patent application Ser. No. 13/417,001, filed on Mar. 19, 2012, the entire disclosure of which is incorporated herein by reference.

BACKGROUND

Embodiments relate to subterranean cementing operations and, in certain embodiments, to set-delayed cement compositions and methods of using set-delayed cement compositions in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for about one day or longer (e.g., about 7 days, about 2 weeks, about 2 years or more) at room temperature (e.g., about 80° F.) in quiescent storage. When desired for use, the set-delayed cement compositions should be capable of being activated whereby reasonable compressive strengths are developed. For example, a cement set activator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

In cementing methods, such as plug-and-abandon operations, a plug is formed in a wellbore to seal off the wellbore for abandonment. In performing plug-and-abandon operations, a plugging composition may be placed in the wellbore at a desired depth. The plugging composition should set in the wellbore, foaming a hardened mass (e.g., a plug) that seals off selected intervals of the wellbore. The plug should prevent and/or reduce zonal communication and migration of fluids that may contaminate water-containing formations. It may be desirable in certain instances to form one or more plugs in the wellbore adjacent to hydrocarbon-producing formations and water-containing formations.

While set-delayed cement compositions have been developed heretofore, challenges exist with their successful use in subterranean cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in subterranean formations having lower bottom hole static temperatures.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Embodiments relate to subterranean cementing operations and, in certain embodiments, to set-delayed cement compositions and methods of using set-delayed cement compositions in subterranean formations. In particular embodiments, set-delayed cement compositions are described for use in plug and abandon operations.

Embodiments of the set-delayed cement compositions may generally comprise water, pumice, hydrated lime, and a set retarder. Optionally, the set-delayed cement compositions may further comprise a dispersant and/or a viscosifier. Embodiments of the set-delayed cement compositions may be foamed. Advantageously, embodiments of the set-delayed cement compositions may be capable of remaining in a pumpable fluid state for an extended period of time. For example, the set-delayed cement compositions may remain in a pumpable fluid state for about 1 day, about 2 weeks, about 2 years, or longer. Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water used in embodiments of the set-delayed cement compositions may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Embodiments of the set-delayed cement compositions may comprise pumice. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 microns, from about 5 microns to about 100 microns, or from about 10 microns to about 25 microns. In one particular embodiment, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Embodiments of the set-delayed cement compositions may comprise hydrated lime. As used herein, the "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the set-delayed cement compositions may comprise a set retarder. A broad variety of set retarders may be suitable for use in the set-delayed cement compositions. For example, the set retarder may comprise phosphonic acids, such as amino tris(methylene phosphonic acid), ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

In some embodiments, a viscosifier may be included in the set-delayed cement compositions. The viscosifier may be included to optimize fluid rheology and to stabilize the suspension. Without limitation, examples of viscosifiers include swellable clays such as bentonite or biopolymers such as cellulose derivatives (e.g., hydroxyethyl cellulose, carboxymethyl cellulose, carboxymethyl hydroxyethyl cellulose). An example of a commercially available viscosifier is SA1015™ available from Halliburton Energy Services, Inc., Houston, Tex. The viscosifier may be included in the set-delayed cement compositions in an amount in the range of from about 0.01% to about 0.5% by weight of the pumice. In specific embodiments, the viscosifier may be present in an amount ranging between any of and/or including any of about 0.01%, about 0.05%, about 0.1%, about 0.2%, about 0.3%, about 0.4%, or about 0.5% by weight of the pumice. One of ordinary skill in the art, with the benefit of this disclosure, will recognize the appropriate amount of viscosifier to include for a chosen application.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. Examples of suitable weighting agents include, for example, materials having a specific gravity of 3 or greater, such as barite. In embodiments, one or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, the set-delayed cement compositions may have a delayed set in that they remain in a pumpable fluid state for one day or longer (e.g., about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with an activator) to set into a hardened mass. The teen "cement set activator" or "activator", as used herein, refers to an additive that activates a set-delayed or heavily retarded cement composition and may also accelerate the setting of the set-delayed, heavily retarded, or other cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 hour, about 2 hours, about 4 hours, about 6 hours, about 8 hours, about 10 hours, or about 12 hours.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Embodiments may include the addition of a cement set activator to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

Some embodiments may include a cement set activator comprising a combination of a monovalent salt and a polyphosphate. The monovalent salt and the polyphosphate may be combined prior to addition to the set-delayed cement composition or may be separately added to the set-delayed cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for embodiments of the set-delayed cement compositions disclosed herein. The ratio of the monovalent salt to the polyphosphate may range, for example, from about 5:1 to about 1:25 or from about 1:1 to about 1:10. Embodiments of the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some embodiments, the combination of the monovalent salt and the polyphosphate may be mixed with a dispersant and water to form a liquid additive for activation of a set-delayed cement composition. Examples of suitable dispersants include, without limitation, the previously described dispersants, such as sulfonated-formaldehyde-based dispersants and polycarboxylated ether dispersants. One example of a commercial dispersant is CFR-3™ dispersant, available from Halliburton Energy Services, Inc. One example of a suitable polycarboxylated ether dispersant is Liquiment® 514L or 5581F dispersants, available from BASF Corporation, Houston, Tex.

The liquid additive may function as a cement set activator. As discussed above, a cement set activator may also accelerate the setting of the set-delayed or heavily retarded cement. The use of a liquid additive to accelerate a set-delayed or heavily retarded cement is dependent upon the compositional makeup of the liquid additive as well as the compositional makeup of the set-delayed or heavily retarded cement. With the benefit of this disclosure, one of ordinary skill in the art should be able to formulate a liquid additive to activate and/or accelerate a set-delayed or heavily retarded cement composition.

The cement set activator may be added to embodiments of the set-delayed cement composition in an amount sufficient to induce the set-delayed cement composition to set into a hardened mass. In certain embodiments, the cement set activator may be added to the set-delayed cement composition in an amount in the range of about 0.1% to about 20% by weight of the pumice. In specific embodiments, the cement set activator may be present in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of cement set activator to include for a chosen application.

As will be appreciated by those of ordinary skill in the art, embodiments of the set-delayed cement compositions may be used in a variety of subterranean operations, including primary and remedial cementing. In some embodiments, a set-delayed cement composition may be provided that comprises water, pumice, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, the addition of a cement set activator to the set-delayed cement composition.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

In primary cementing embodiments, for example, embodiments of the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

As will be appreciated by those of ordinary skill in the art, embodiments of the set-delayed cement compositions may be used as plugging compositions for forming a seal in plug-and-abandon operations. Embodiments of the set-delayed cement plugging compositions may be used onshore or offshore. Set-delayed cement plugging compositions may be preferred over traditional plugging compositions in certain applications (e.g., offshore applications) because a set-delayed cement plugging composition may require less equipment and personnel to use, which may be particularly advantageous in operations where space is limited. An example of a method for plugging and abandoning a well comprises placing a plugging composition in a selected plug location in a wellbore and allowing the plugging composition to set to form a plug. The plug location may be selected so that the wellbore can be sealed off for abandonment. For example, the plug location may be selected so that a selected interval of the wellbore may be sealed. In an embodiment, the selected location may be adjacent to a hydrocarbon-containing formation or a water-containing formation. In an embodiment, the plugging and abandoning operation may include the formation of two or more plugs in the wellbore. For example, a method may further include the placement of a second plugging composition in another selected plug location in the wellbore. Additionally, the plugging technique may comprise any such pump that is sufficient for a given application. Moreover certain applications may comprise wireline operated dump bailers.

Embodiments comprise the formation of a cement plug in a wellbore with low permeability. Low permeability is defined as a plug with a permeability of less than about 0.1 millidarcy. A cement plug with low permeability prevents the migration of fluids and gas.

An embodiment comprises A method of plugging a wellbore, comprising: providing a set-delayed cement composition comprising pumice, hydrated lime, a cement set retarder, and water; activating the set-delayed cement composition to produce an activated set-delayed cement composition; introducing the activated set-delayed cement composition into the wellbore; and allowing the activated set-delayed cement composition to form a plug in the wellbore that has a permeability of less than 0.1 millidarcy. The set-delayed cement composition may comprise one or more of the additional additives described herein.

An embodiment comprises a method of plugging a wellbore, comprising: providing a cement composition comprising water, pumice, hydrated lime, a dispersant, a viscosifier, a weighting agent, and a cement set retarder; storing the cement composition for a period of about 1 day or longer; activating the cement composition to produce an activated cement composition; introducing the activated cement composition into the wellbore; and allowing the cement composition to form a plug in the wellbore that has a permeability of less than 0.1 millidarcy. The cement composition may comprise one or more of the additional additives described herein.

An embodiment comprises a set-delayed cementing system for plugging a wellbore comprising: a set-delayed cement composition comprising: water, pumice, hydrated lime, and a cement set retarder; a cement set activator for activating the set-delayed cement composition, mixing equipment for mixing the set-delayed cement composition and the cement set activator to produce an activated set-delayed cement composition, and equipment for delivering the activated set-delayed cement composition to a wellbore. The set-delayed cement composition may further comprise one or more of the additional additives described herein.

Figure 1:
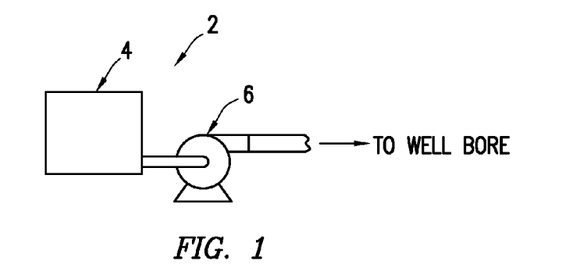
FIG. 1 illustrates a system for the preparation and delivery of a set-delayed cement composition into a wellbore in accordance with certain embodiments.

Referring now to FIG. 1, the preparation of a set-delayed cement composition in accordance with example embodiments will now be described for applications in which the set-delayed cement composition is pumped downhole. FIG. 1 illustrates a system 2 for the preparation of a set-delayed cement composition and subsequent delivery of the composition to a wellbore in accordance with certain embodiments. As shown, the set-delayed cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole.

In offshore operations where rig space may be limited, the set-delayed cement composition may be prepared onshore and delivered to the well site in fit-for-purpose delivery tanks. In some embodiments the mixing equipment may be the same as described in the description of FIG. 1 above.

Figure 2A:
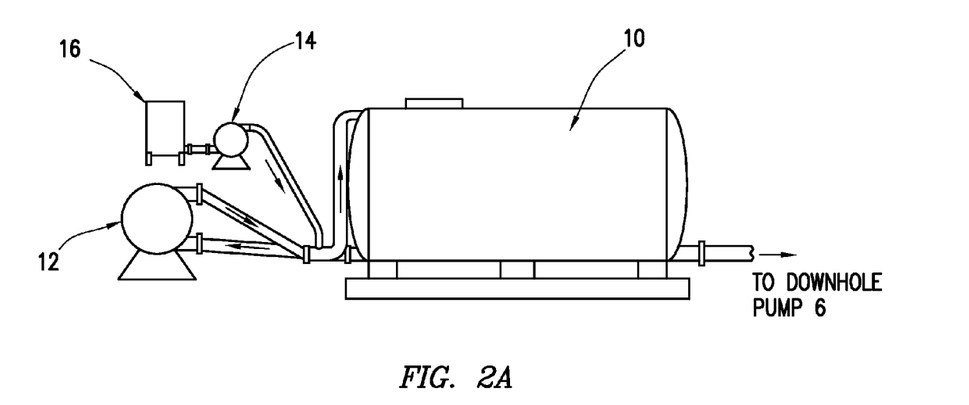
FIG. 2A illustrates a liquid storage vessel that may be used in the delivery of a set-delayed cement composition into a wellbore in accordance with certain embodiments.

Referring now to FIG. 2A, the delivery system for some embodiments may include a liquid storage vessel 10 with a detached circulating pump 12, additive skid 14, and additive tank 16. The detached circulating pump 12 may be used to re-circulate the set-delayed cement composition in the liquid storage vessel 10. The additive skid 14 (which may include a pump, for example) may be used to deliver additives from additive tank 16 to the set-delayed cement composition in the liquid storage vessel 10.

Figure 2B:
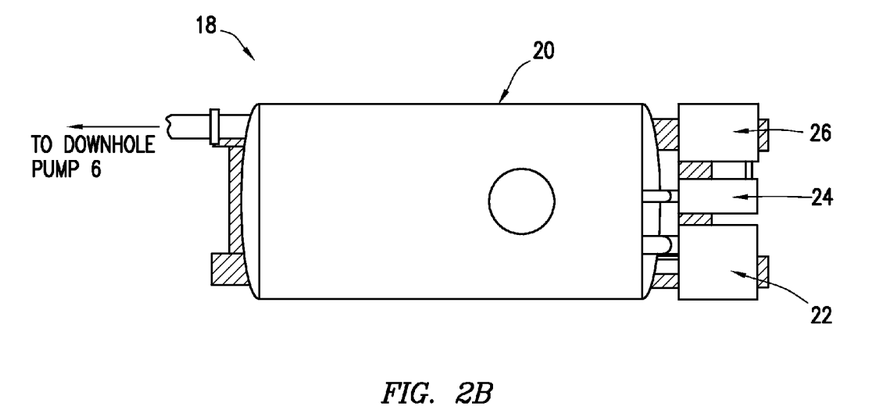
FIG. 2B illustrates a self-contained delivery system that may be used in the delivery of a set-delayed cement composition into a wellbore in accordance with certain embodiments.

Referring now to FIG. 2B, the delivery system for some embodiments may include a self-contained delivery system 18 which comprises a storage tank 20, circulating pump 22, liquid additive system 24, and additive tank 26. The circulating pump 22 may be used to re-circulate the set-delayed cement composition in the storage tank 20. The liquid additive system 24 (which may include a pump, for example) may be used to deliver additives from additive tank 26 to the set-delayed cement composition in the storage tank 20.

Figure 3:
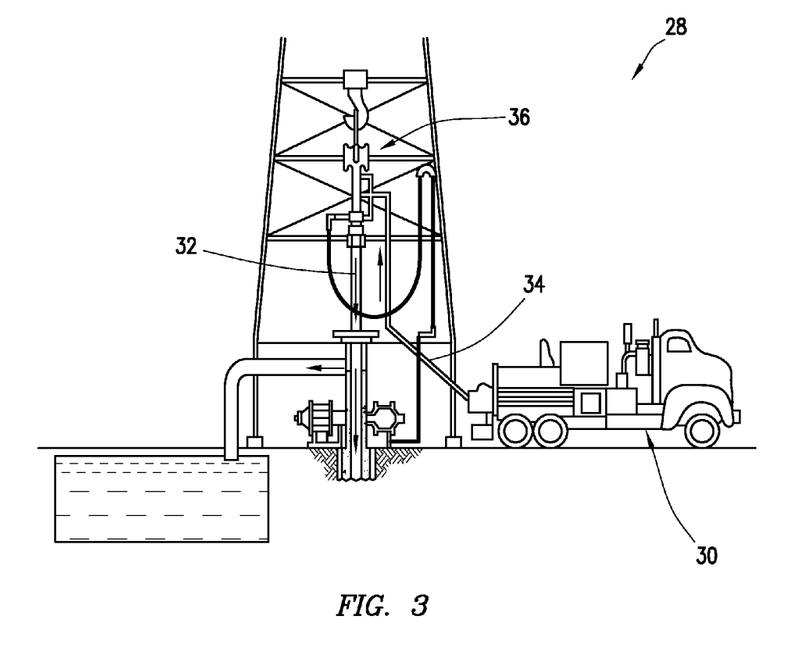
FIG. 3 illustrates an example embodiment of surface equipment that may be used in the placement of a set-delayed cement composition in accordance with certain embodiments.

FIG. 3 illustrates surface equipment 28, which may be used in the placement of a set-delayed cement composition in accordance with certain embodiments. It should be noted that while FIG. 3 generally depicts a land-based operation, those skilled in the art will readily recognize that the principles described herein are equally applicable to subsea operations that employ floating or sea-based platforms and rigs, without departing from the scope of the disclosure. As illustrated by FIG. 3, the surface equipment 28 may include a cementing unit 30, which may include one or more cement trucks. The cementing unit 30 may include mixing equipment 4 and pumping equipment 6 (e.g., FIG. 1) as will be apparent to those of ordinary skill in the art. The cementing unit 30 may pump a set-delayed cement composition 32 through a feed pipe 34 and to a tubing connection 36 which conveys the set-delayed cement composition 32 downhole.

An example embodiment for placing a set-delayed cement composition across a set of open perforations and/or a casing leak will be described with reference to FIG. 4. The set-delayed cement composition 32 may be placed across the perforations and/or casing leak 38 in accordance with example embodiments. As illustrated, a cement retainer or squeeze packer 40 may be ran to a depth above the open perforations and/or casing leak 38 and set on either wireline or tubing 42. While wellbore 44 is shown extending generally vertically into the subterranean formation 46, the principles described herein are also applicable to wellbores that extend at an angle through the subterranean formation 46, such as horizontal and slanted wellbores. As illustrated, the wellbore 44 comprises walls 48. In the illustrated embodiment, a casing 50 has been inserted into the wellbore 44. The casing 50 may be cemented to the walls 48 of the wellbore 44 by cement sheath 52.

Figure 4:
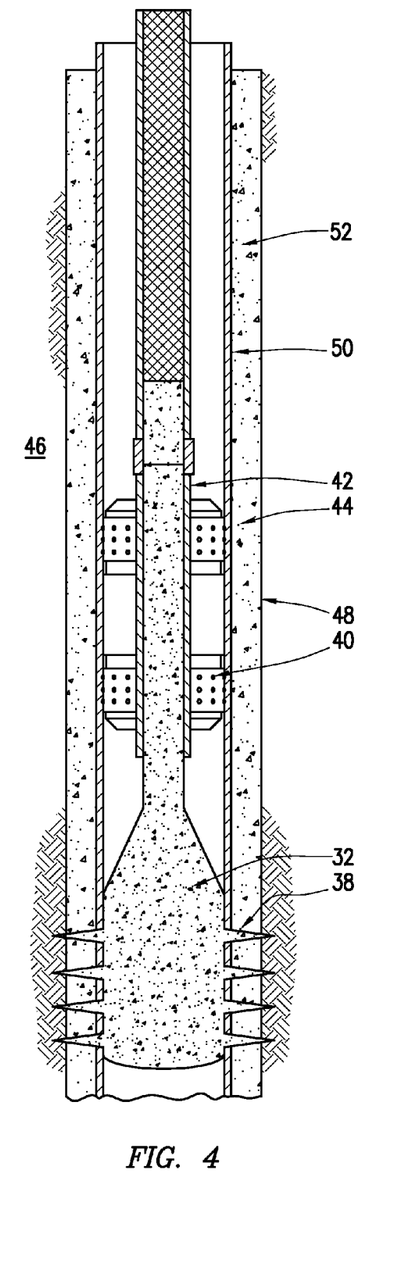
FIG. 4 illustrates an embodiment for the placement of a set-delayed cement composition across a set of open perforations and/or a casing leak in accordance with certain embodiments.

With continued reference to FIG. 4, the set-delayed cement composition 32 may be pumped down the interior of the tubing 42. The set-delayed cement composition 32 may be allowed to flow down the interior of the tubing 42 through the cement retainer or squeeze packer 40 at the bottom of the tubing 42 and down across and into the open perforations and/or casing leak 38. The set-delayed cement composition 32 may be allowed to set inside the casing 50, for example, to form a plug that seals the open perforations and/or casing leak 38 in the wellbore 44. While not illustrated, other techniques may also be utilized for introduction of the set-delayed cement composition 32. By way of example, open ended tubing and/or drill pipe may be used to place the set-delayed cement composition 32 across the open perforations and/or casing leak 38.

Figure 5:
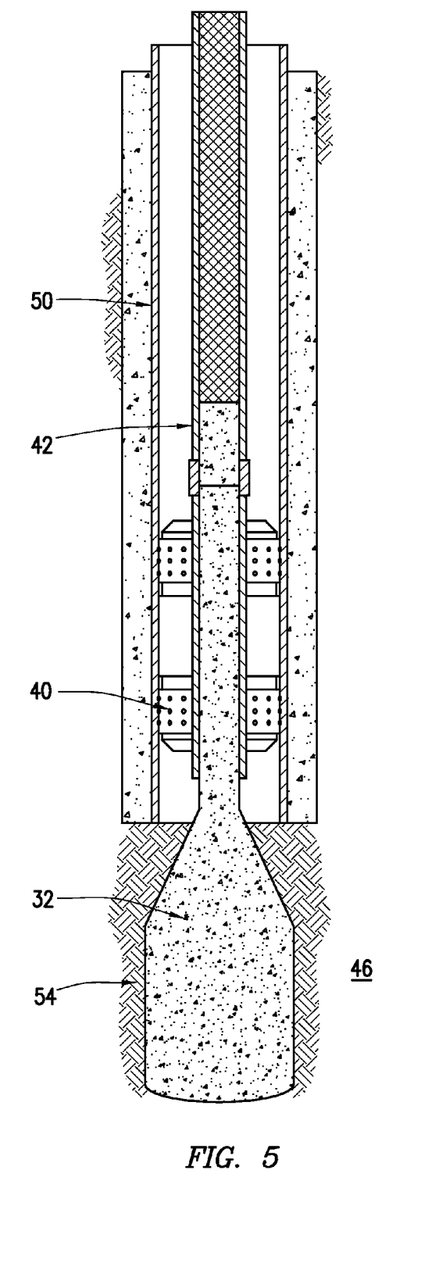
FIG. 5 illustrates an embodiment for the placement of a set-delayed cement composition within an openhole section in accordance with certain embodiments.

FIG. 5 illustrates an additional embodiment comprising the placement of the set-delayed cement composition 32 within an openhole section 54 to isolate the formation 46 below. FIG. 5 shows the set-delayed cement composition 32 inside the openhole section 54, but the set-delayed cement composition 32 may at times enter into the casing 50 above. As with the embodiment described in FIG. 4, the set-delayed cement composition 32 may be pumped through the drillpipe and/or tubing 42 and a cement retainer or squeeze packer 40. In some embodiments the drillpipe and/or tubing 42 may be open ended.

Figure 6:
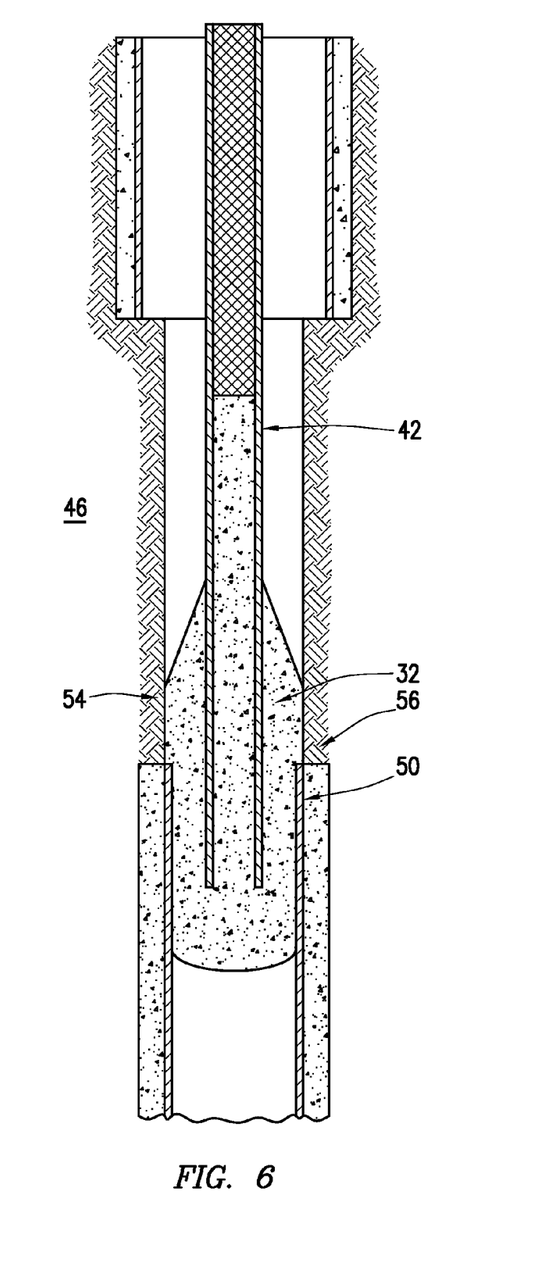
FIG. 6 illustrates an embodiment for the placement of a set-delayed cement composition across the top of a fish and/or casing stub in accordance with certain embodiments.

FIG. 6 illustrates an embodiment comprising the placement of a cement plug across the top of well equipment, such as a fish and/or casing stub 56. The set-delayed cement composition 32 may be spotted through an open ended drillpipe or tubing 42. The bottom of the set-delayed cement composition 32 may be placed at a predetermined distance into the casing 50 and back up into the openhole section 54 above the casing stub 56.

Figure 7:
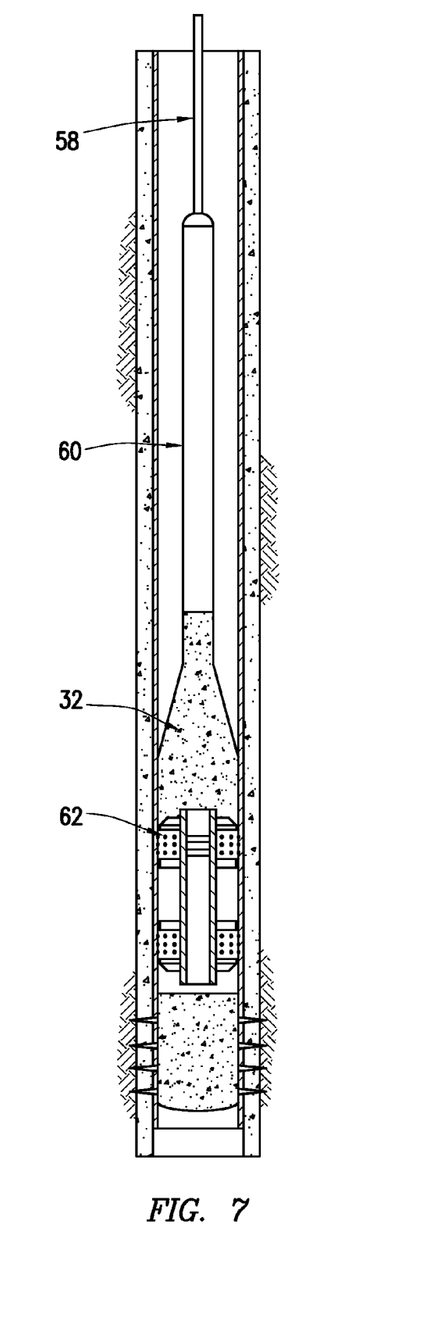
FIG. 7 illustrates an embodiment for the placement of a set-delayed cement composition utilizing a wireline deployed dump bailer in accordance with certain embodiments.

FIG. 7 illustrates an embodiment comprising the setting of a cementing plug utilizing a wireline 58 deployed dump bailer 60. In this embodiment, the set-delayed cement composition 32 may be placed above either a fish or bridge plug 62. The set-delayed cement composition 32 may be pre-mixed and placed inside the dump bailer 60. The dump bailer 60 may then be ran to the necessary depth via wireline 58 and either dumped via a remotely operated valve located at the bottom of the dump bailer 60 or a class of ceramic disk may be broken by bumping it against the bottom of the hole. Once the set-delayed cement composition 32 is removed from the dump bailer 60, the dump bailer 60 may be pulled back to the surface and additional runs may be performed if necessary.

Figure 8:
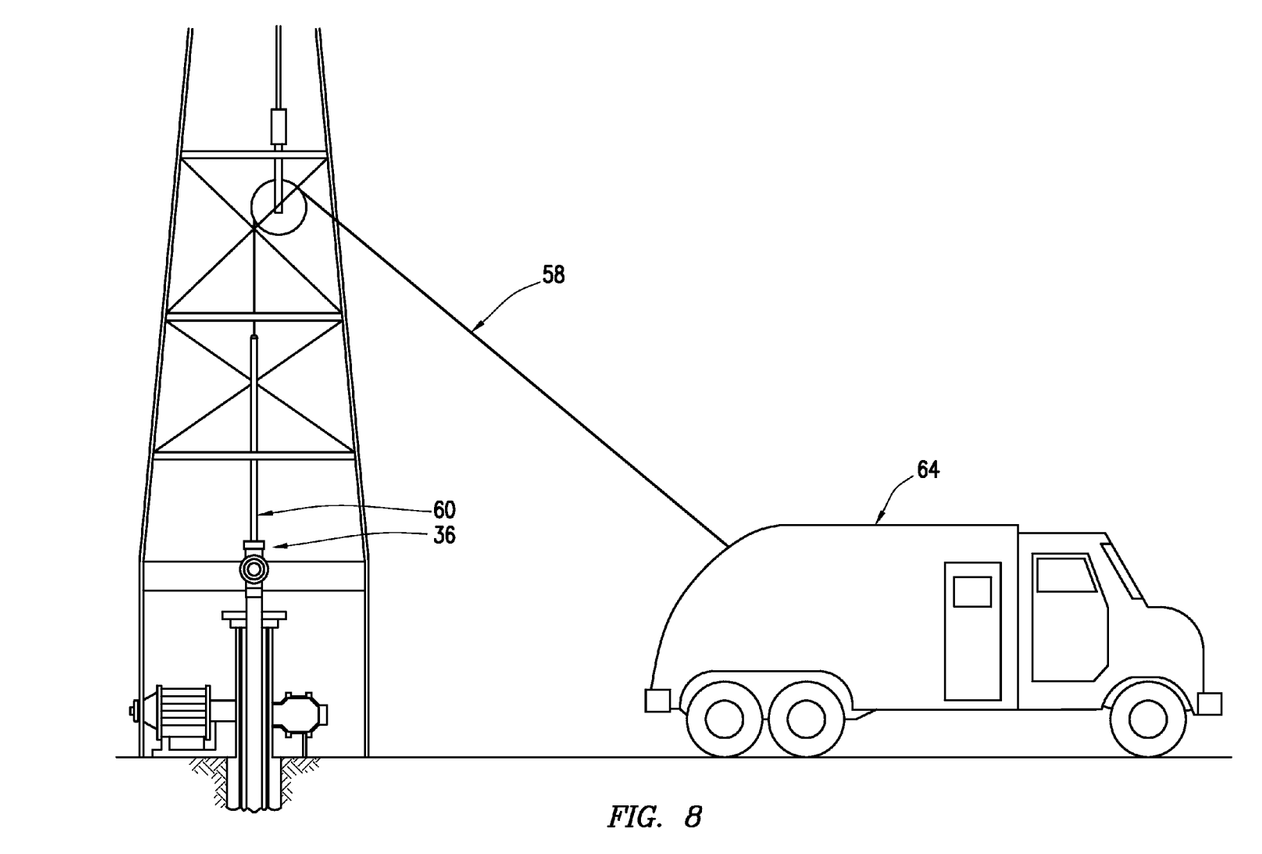
FIG. 8 illustrates an example of surface equipment that may be used in embodiments comprising a wireline dump bailer for placement of a set-delayed cement composition in accordance with certain embodiments.

FIG. 8 illustrates an embodiment of a standard surface rig up for a dump bailer 60 operation. As illustrated, a wireline truck 64 or skid may be utilized to lower the dump bailer 60 through the tubing connection 36 via either electric wireline 58 or slickline.

In alternative embodiments, the set-delayed cement composition may be placed utilizing coiled tubing as the means of conveyance instead of sectioned tubing. This means of conveyance can be utilized to perform any of the job types as described above.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLES

Example 1

The following example describes a set-delayed cement plugging composition comprising the following components:

TABLE 1

| Compositional Makeup | | |
|---|---|---|
| Component | Amount | Unit* |
| Water | 60 | % bwoP |
| Pumice | 100 | % bwoP |
| Lime | 20 | % bwoP |
| Weighting Agent | 2 | % bwoP |
| Retarder | 0.06 | Gal/sk |
| Dispersant | 0.6 | % bwoP |
| Viscosifier | 0.035 | % bwoP |

*% bwoP = by weight of pumice; Gal/sk = gallons per 46 lb. sack of pumice

The composition had a density of 13.6 pounds per gallon. The weighting agent was Micromax® FF weight additive available from Halliburton Energy Services, Inc., Houston, Tex. The cement retarder was Micro Matrix® Cement Retarder available from Halliburton Energy Services, Inc., Houston, Tex. The dispersant was Liquiment 5581F dispersant available from BASF, Florham Park, N.J. The viscosifier was SA-1015™ suspending agent available from Halliburton Energy Services, Inc., Houston, Tex. After preparation, the rheological properties of the sample was measured using a Model 35A Fann Viscometer and a No. 2 spring with a Fann Yield Stress Adapter (FYSA), in accordance with the procedure set forth in API RP Practice 10B-2, *Recommended Practice for Testing Well Cements*. The results are presented in Table 2 below. The apparent viscosities were calculated using the torque dial readings and the calibrated factors that convert RPM to shear rate and dial readings to shear stress. The 3D and 6D Decay readings were dial readings 15 seconds after stopping the Model 35A Fann Viscometer after it was operating at 3 RPM and 6 RPM respectively.

TABLE 2

| Apparent Viscosities (cP) and Decay Readings | | | | | | | | | | |
|---|---|---|---|---|---|---|---|---|---|---|
| | RPM | | | | | | | | Decay | |
| Age | 3 | 6 | 30 | 60 | 100 | 200 | 300 | 600 | 3D | 6D |
| Day 2 | 19947 | 11560 | 2720 | 1949 | 1102 | 802 | 703 | 573 | 28 | 30 |
| Day 3 | 29467 | 14733 | 3309 | 1904 | 1224 | 816 | 680 | 476 | 40 | 42 |
| Day 3* | 15867 | 9067 | 2221 | 1269 | 870 | 612 | 526 | 408 | 25 | 42 |
| Day 7 | 20627 | 10540 | 2312 | 1383 | 986 | 673 | 576 | 471 | 8 | 6 |
| Day 8 | 24933 | 12467 | 2629 | 1519 | 1047 | 639 | 539 | 444 | 12 | 10 |
| Day 10 | 22213 | 10880 | 2267 | 1292 | 870 | 605 | 517 | 424 | 8 | 7 |
| Day 11 | 16230 | 8387 | 1995 | 1179 | 816 | 578 | 485 | 422 | 6 | 6 |
| Day 12 | 13600 | 7027 | 1768 | 1043 | 721 | 503 | 440 | 408 | 5 | 5 |
| Day 13 | 12240 | 6327 | 1723 | 1043 | 830 | 551 | 453 | 408 | 3 | 4 |
| Day 14 | 16320 | 8387 | 1904 | 1111 | 789 | 578 | 503 | 453 | 6 | 5 |
| Day 15 | 9520 | 4760 | 1133 | 680 | 476 | 367 | 340 | 311 | 3 | 3 |
| Day 16 | 9520 | 5213 | 1405 | 884 | 694 | 530 | 481 | 390 | 3 | 2 |

TABLE 2-continued

Apparent Viscosities (cP) and Decay Readings

| Age | RPM | | | | | | | | Decay | |
| --- | --- | --- | --- | --- | --- | --- | --- | --- | --- | --- |
| | 3 | 6 | 30 | 60 | 100 | 200 | 300 | 600 | 3D | 6D |
| Day 17 | 9973 | 5213 | 1405 | 839 | 612 | 476 | 417 | 385 | 3 | 3 |
| Day 18 | 7523 | 4307 | 1224 | 771 | 598 | 456 | 413 | 413 | 1 | 2 |
| Day 20 | 8160 | 4307 | 1179 | 748 | 598 | 456 | 417 | 383 | 2 | 2 |
| Day 21 | 8160 | 4533 | 1224 | 793 | 612 | 462 | 413 | 374 | 3 | 2 |
| Day 22 | 10427 | 5213 | 1269 | 839 | 653 | 503 | 458 | 408 | 4 | 4 |
| Day 24 | 8613 | 4760 | 1315 | 839 | 612 | 483 | 422 | 381 | 3 | 3 |
| Day 27 | 9067 | 4533 | 1451 | 907 | 666 | 510 | 449 | 397 | 4 | 4 |
| Day 31 | 11787 | 5893 | 1451 | 907 | 653 | 469 | 417 | 381 | 6 | 5 |

*After addition of 26 gallons of water, lowering the slurry density from 13.8 ppg to 13.6 ppg.

Table 3 tabulates the apparent viscosity of the composition at 100 rpm versus the composition age. The results are presented below.

TABLE 3

Apparent Viscosity at 100 RPM

| Age | Apparent Viscosity (Centipoise) |
| --- | --- |
| Day 2 | 1102 |
| Day 3 | 1224 |
| Day 3* | 870 |
| Day 7 | 986 |
| Day 8 | 1047 |
| Day 10 | 870 |
| Day 11 | 816 |
| Day 12 | 721 |
| Day 13 | 830 |
| Day 14 | 789 |
| Day 15 | 476 |
| Day 16 | 694 |
| Day 17 | 612 |
| Day 18 | 598 |
| Day 20 | 598 |
| Day 21 | 612 |
| Day 22 | 653 |
| Day 24 | 612 |
| Day 27 | 666 |
| Day 28 | 639 |
| Day 29 | 639 |

TABLE 3-continued

Apparent Viscosity at 100 RPM

| Age | Apparent Viscosity (Centipoise) |
| --- | --- |
| Day 30 | 666 |
| Day 31 | 653 |

*After addition of 26 gallons of water, lowering the slurry density from 13.8 ppg to 13.6 ppg.

The data shows a gradual decrease in viscosity from day 2 through day 14, after which time the viscosity of the composition begins to stabilize around an average of 625 cP through day 31. This decline in apparent viscosity in the early going and subsequent stabilization may be advantageous for storing, mixing, and pumping the set-delayed cement composition and presents a distinctive feature in that it avoids the need for post-prep treatments such as additional dispersant or water to mitigate increasing viscosity.

The destructive 24-hour compressive strength of the sample was measured after the addition of a 2% active liquid additive cement set activator comprising sodium sulfate, sodium hexametaphosphate, a polycarboxylated ether dispersant, and water. The destructive compressive strength was measured by allowing the samples to cure in a 2" by 4" plastic cylinder that was placed in a water bath at 134° F. to form set cylinders. Immediately after removal from the water bath, destructive compressive strengths were determined using a mechanical press in accordance with API RP 10B-2, *Recommended Practice for Testing Well Cements*. The results of this test are set forth below in Table 4. The reported compressive strengths are an average for two cylinders of each sample.

TABLE 4

Compressive Strength

| | 24-Hr. Compressive Strength at 134° F. (psi) | | | | | | |
| --- | --- | --- | --- | --- | --- | --- | --- |
| Activator | Day 0 | Day 1 | Day 2 | Day 7 | Day 14 | Day 21 | Day 28 | Day 35 |
| 2% Liquid Additive | 108 | 381 | 552 | 485 | 705 | 513 | 899 | 440 |

The results show that the 24-hour strength development becomes more rapid as the slurry ages from the initial preparation, and then stabilizes throughout the remainder of the time.

The destructive 24-hour compressive strength of the sample was further measured at the 21-day mark after further curing the sample for 1 day, 3 days, or 7 days. The sample was activated either with the addition of a 2% active liquid additive cement set activator comprising sodium sulfate, sodium hexametaphosphate, a polycarboxylated ether dispersant, and water; or a 10% CaCl$_2$ solution. The destructive compressive strength was measured by allowing the samples to cure in a 2" by 4" plastic cylinder that was placed in a water bath at 134° F. (140° F. for the 7 day sample) to form set cylinders. Immediately after removal from the water bath, destructive compressive strengths were determined using a mechanical press in accordance with API RP 10B-2, *Recommended Practice for Testing Well Cements*. The results of this test are set forth below in Table 5. The reported compressive strengths are an average for two cylinders of each sample.

TABLE 5

| | Compressive Strength | | |
|---|---|---|---|
| | Compressive Strength at Day 21 (psi) | | |
| Activator | Cured 1 Day | Cured 3 Days | Cured 7 Days |
| 2% Liquid Additive | 513 | 1678 | 2245 |
| 10% CaCl$_2$ | 35 | 961 | 1450 |

The results show that, as expected, the compressive strengths increase alongside increasing curing time.

Example 2

Table 6 below provides two other formulations of set-delayed cement plugging compositions and their corresponding 30-day compressive strengths (psi) and 5-day permeability (md) measurements. Composition A had a density of 13.5 pounds per gallon. Composition B had a density of 16.3 pounds per gallon. The cement retarder was Micro Matrix® Cement Retarder available from Halliburton Energy Services, Inc., Houston, Tex. The dispersant was Liquiment 5581F dispersant available from BASF, Florham Park, N.J. The viscosifier was V-Mar® 3 concrete rheology-modifying admixture available from W. R. Grace & Co., Cambridge, Mass. The weighting agent was Micromax® FF weight additive available from Halliburton Energy Services, Inc., Houston, Tex.

| Sample A | | | Sample B | | |
|---|---|---|---|---|---|
| Material | Amount | Unit | Material | Amount | Unit |
| Water | 60 | % bwoP | Water | 49 | % bwoP |
| Pumice | 100 | % bwoP | Pumice | 100 | % bwoP |
| Lime | 20 | % bwoP | Lime | 20 | % bwoP |
| Retarder | 0.06 | Gal/sk | Retarder | 0.06 | Gal/sk |
| Dispersant | 0.6 | % bwoP | Dispersant | 1.1 | % bwoP |
| Viscosifier | 0.05 | Gal/sk | Viscosifier | 0.05 | Gal/sk |
| | | | Weighting Agent | 45 | % bwoP |
| 30-Day Compressive Strength (psi) | 3170 | | 30-Day Compressive Strength (psi) | 4430 | |
| 5-Day Permeability (md) | 0.00056 | | 5-Day Permeability (md) | 0.00030 | |

Both samples had high long-term compressive strengths (>3000 psi) and low permeability results (<0.001 md). These results indicate that the set-delayed cement compositions are suitable for plugging compositions that are suitable for sealing off wells and maintain seal integrity over the course of well abandonment, i.e. preventing the passage of fluids.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of plugging a wellbore, comprising:
    providing a set-delayed cement composition comprising pumice, hydrated lime, a phosphonic acid derivative cement set retarder, a polycarboxylated ether dispersant, and water;
    activating the set-delayed cement composition to produce an activated set-delayed cement composition;
    introducing the activated set-delayed cement composition into the wellbore; and
    allowing the activated set-delayed cement composition to form a plug in the wellbore, wherein the plug has a permeability of less than 0.1 millidarcy.

2. The method of claim 1 wherein the pumice has a mean particle size in a range of about 10 micron to about 25 microns.

3. The method of claim 1 wherein the pumice and the hydrated lime are present in a weight ratio of pumice to hydrated lime of about 10:1 to about 1:1.

4. The method of claim 1 wherein the set-delayed cement composition has a pumice-to-hydrated-lime weight ratio of about 3:1 to about 5:1, wherein the cement set retarder is present in an amount of about 0.01% to about 2% by weight of the pumice, and wherein the polycarboxylated ether dispersant is present in an amount of about 0.01% to about 2% by weight of the pumice.

5. The method of claim 1 wherein the set-delayed cement composition further comprises at least one additive selected from the group consisting of a viscosifier, a weighting agent, a lightweight additive, a gas-generating additive, a mechanical-property-enhancing additive, a lost-circulation material, a filtration-control additive, a fluid-loss-control additive, a defoaming agent, a foaming agent, a thixotropic additive, and any combination thereof.

6. The method of claim 1 wherein the set-delayed cement composition remains in a pumpable fluid state for a time period of about 7 days or longer prior to the activating.

7. The method of claim 1 wherein the set-delayed cement composition remains in a pumpable fluid state for a time period of about 30 days or longer prior to the activating.

8. The method of claim 1 wherein the step of activating the set-delayed cement composition comprises adding a cement set activator to the set-delayed cement composition.

9. The method of claim 8, wherein the cement set activator comprises a liquid additive comprising sodium sulfate, sodium hexametaphosphate, a dispersant, and water.

10. The method of claim 1 wherein the set-delayed cement composition further comprises a biopolymer viscosifier.

11. The method of claim 1 wherein the wellbore is disposed within a subterranean formation having a bottom hole static temperature between about 100° F. to about 450° F.

12. The method of claim 1 wherein the water is present in an amount of about 33% to about 200% by weight of the pumice.

13. The method of claim 1 wherein the set-delayed cement composition has a density in the range of from about 4 lb/gal to about 20 lb/gal.

14. A method of plugging a wellbore, comprising:
providing a cement composition comprising water, pumice, hydrated lime, a polycarboxylated ether dispersant, a viscosifier, a weighting agent, and a phosphonic acid derivative cement set retarder;
storing the cement composition for a period of about 1 day or longer;
activating the cement composition to produce an activated cement composition;
introducing the activated cement composition into the wellbore; and
allowing the activated cement composition to form a plug in the wellbore, wherein the plug has a permeability of less than 0.1 millidarcy.

15. The method of claim 14 wherein the pumice and the hydrated lime are present in a weight ratio of pumice to hydrated lime of about 10:1 to about 1:1.

16. The method of claim 14 wherein the viscosifier comprises a biopolymer, and wherein the cement set activator comprises a liquid additive comprising sodium sulfate, sodium hexametaphosphate, a dispersant, and water.

17. The method of claim 14 wherein the cement composition is stored for a time period of about 30 days or longer.

18. A set-delayed cementing system for plugging a wellbore comprising:
a set-delayed cement composition comprising:
water,
pumice,
hydrated lime,
a polycarboxylated ether dispersant, and
a phosphonic acid derivative cement set retarder;
a cement set activator for activating the set-delayed cement composition,
mixing equipment for mixing the set-delayed cement composition and the cement set activator to produce an activated set-delayed cement composition, and
equipment for delivering the activated set-delayed cement composition to a wellbore.

19. The system of claim 18, wherein the set-delayed cement composition further comprises a viscosifier.

20. The system of claim 19 wherein the equipment for delivering the activated set-delayed cement composition comprises pumping equipment or a dump bailer.

* * * * *